(12) United States Patent
Koike (10) Patent No.: US 8,804,963 B2
(45) Date of Patent: Aug. 12, 2014

(54) COMPUTER READABLE MEDIUM STORING KEY GENERATING PROGRAM, COMPUTER READABLE MEDIUM STORING KEY RECORDING PROGRAM, KEY GENERATING DEVICE, PKI CARD, KEY RECORDING SYSTEM, KEY GENERATING METHOD AND KEY RECORDING METHOD

(75) Inventor: Masamichi Koike, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 898 days.

(21) Appl. No.: 12/558,610

(22) Filed: Sep. 14, 2009

(65) Prior Publication Data
US 2010/0239094 A1  Sep. 23, 2010

(30) Foreign Application Priority Data
Mar. 23, 2009  (JP) .................. 2009-070680

(51) Int. Cl.
*H04L 9/08* (2006.01)

(52) U.S. Cl.
USPC .............. 380/278; 380/44; 380/47; 713/156; 713/173; 713/178

(58) Field of Classification Search
CPC ............ H04L 9/08; H04L 9/18; H04L 9/006; H04L 9/30; H04L 9/3297; H04L 9/3247; G06F 21/10
USPC .............. 380/44, 47, 278; 713/156, 178, 173
See application file for complete search history.

(56) References Cited

U.S. PATENT DOCUMENTS

| | | | |
|---|---|---|---|
| 5,109,152 A | 4/1992 | Takagi et al. | |
| 8,117,453 B2 * | 2/2012 | Huque | 713/172 |
| 2002/0048372 A1 * | 4/2002 | Toh et al. | 380/285 |
| 2003/0056099 A1 | 3/2003 | Asanoma et al. | |
| 2003/0115466 A1 | 6/2003 | Aull et al. | |
| 2005/0033964 A1 * | 2/2005 | Albanese et al. | 713/171 |
| 2006/0020782 A1 | 1/2006 | Kakii | |
| 2006/0168447 A1 * | 7/2006 | Pailles et al. | 713/176 |
| 2007/0234045 A1 * | 10/2007 | Ishiyama | 713/158 |
| 2009/0132813 A1 * | 5/2009 | Schibuk | 713/158 |
| 2009/0187983 A1 * | 7/2009 | Zerfos et al. | 726/10 |

FOREIGN PATENT DOCUMENTS

| | | |
|---|---|---|
| JP | 2-031290 A | 2/1990 |
| JP | 11-102463 A | 4/1999 |
| JP | 2003-092565 A | 3/2003 |
| JP | 2003-234729 A | 8/2003 |
| JP | 2006-60779 A | 3/2006 |

OTHER PUBLICATIONS

Japanese Office Action dated Feb. 22, 2011 in corresponding Japanese patent application No. 2009-070680.

\* cited by examiner

*Primary Examiner* — Mohammad A Siddiqi
(74) *Attorney, Agent, or Firm* — Sughrue Mion, PLLC (57) ABSTRACT

A computer readable medium stores a program causing a computer to execute a key generating processing. The computer generates a signatory private key which is used in an electronic signature, a signatory public key, a signatory public key certificate, a certification public key which is used when recording the signatory private key in a PKI card and a certification private key, transmits the certification private key to the PKI card via a secure communication path, and transmits an encoded signatory key obtained by encoding the signatory public key certificate and the signatory private key using the certification public key to the PKI card via the secure communication path or a non-secure communication path.

6 Claims, 7 Drawing Sheets

COMPUTER READABLE MEDIUM STORING KEY GENERATING PROGRAM, COMPUTER READABLE MEDIUM STORING KEY RECORDING PROGRAM, KEY GENERATING DEVICE, PKI CARD, KEY RECORDING SYSTEM, KEY GENERATING METHOD AND KEY RECORDING METHOD

CROSS-REFERENCE TO RELATED APPLICATIONS

This application is based on and claims priority under 35 USC 119 from Japanese Patent Application No. 2009-070680 filed Mar. 23, 2009.

BACKGROUND

1. Technical Field

The present invention relates to a computer readable medium storing a key generating program, a computer readable medium storing a key recording program, a key generating device, a PKI card, a key recording system, a key generating method and a key recording method.

2. Related Art

A technique has been provided in which plural private keys are recorded in a card in advance and the plural private keys are used by switching between the plural private keys. A technique has been provided in which random data generated in an IC card is used to encode plural private keys stored in a card and confirm whether or not the plural private keys may be decoded.

SUMMARY

According to an aspect of the invention, there is provided a computer readable medium storing a program causing a computer to execute key generating processing, the process including: generating a certification public key which is used when recording a signatory private key used in an electronic signature in a PKI card and a certification private key which corresponds to the certification public key; transmitting the generated certification private key to the PKI card via a secure communication path; generating a certification public key certificate for the certification public key; recording the generated certification public key certificate in a memory; generating a signatory public key used in the electronic signature and the signatory private key corresponding to the signatory public key; generating a signatory public key certificate for the signatory public key; acquiring the certification public key certificate that is recorded in the memory; generating an encoded signatory key which is obtained by encoding the generated signatory public key certificate and the generated signatory private key using the certification public key indicated in the acquired certification public key certificate; and transmitting the encoded signatory key to the PKI card via the secure communication path or via a non-secure communication path.

BRIEF DESCRIPTION OF THE DRAWINGS

Exemplary embodiments of the present invention will be described in detail based on the following figures, wherein.

DETAILED DESCRIPTION

Hereinafter, an exemplary embodiment of the present invention is described in detail with reference to drawings.

Figure 1:
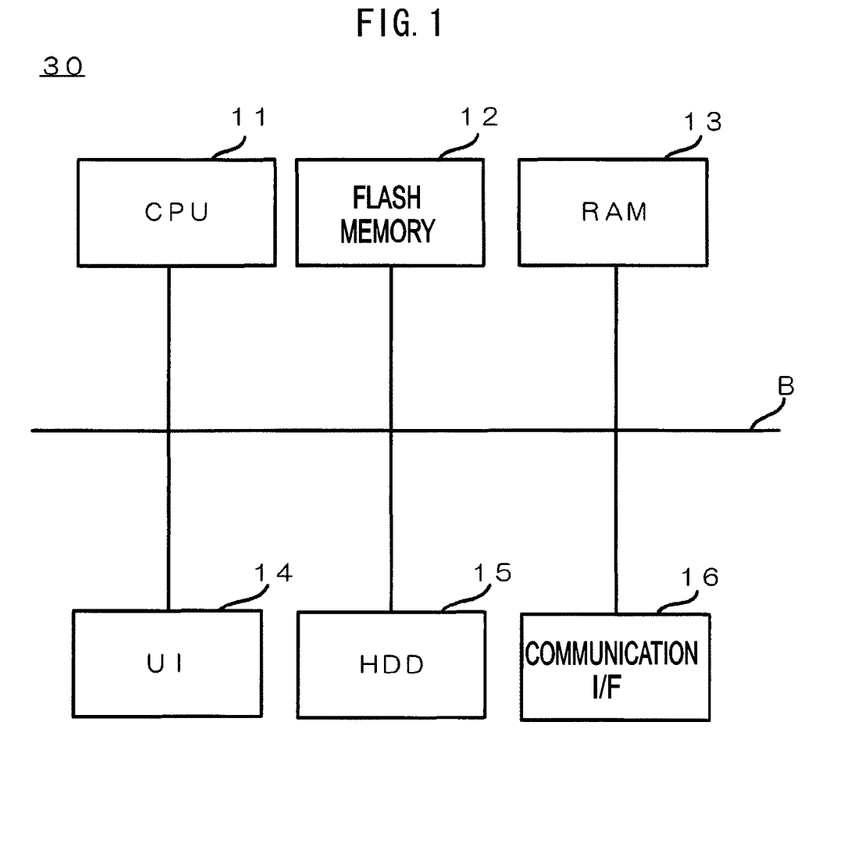
FIG. 1 is a view showing an example of a hardware configuration of a key generating device.

FIG. 1 shows an example of a hardware configuration of a key generating device 30. The key generating device 30 includes a central processing unit (CPU) 11, a flash memory 12, a random access memory (RAM) 13, a user interface (UI) 14, a hard disk drive (HDD) 15, a communication interface (I/F) 16 and a bus B.

The CPU 11 is responsible for entire operation of the key generating device 30, and a processing shown in a sequence diagram to be described later is executed by the CPU 11. The flash memory 12 stores a program developed in the RAM 13, a boot program operating when activating and the like.

The RAM 13 is a storage device in which an operating system (OS), the program, image information and the like are developed. The UI 14 is used when a user operates the key generating device 30 and inputs the information. The HDD 15 is a storage device recording various pieces of information such as a key generating program.

The communication I/F 16 includes a network interface card (NIC) for connecting to a network and a driver thereof, or a USB device and the like. The communication I/F 16 may communicate with the PKI card. The bus B is used when communicating the information.

Figure 2:
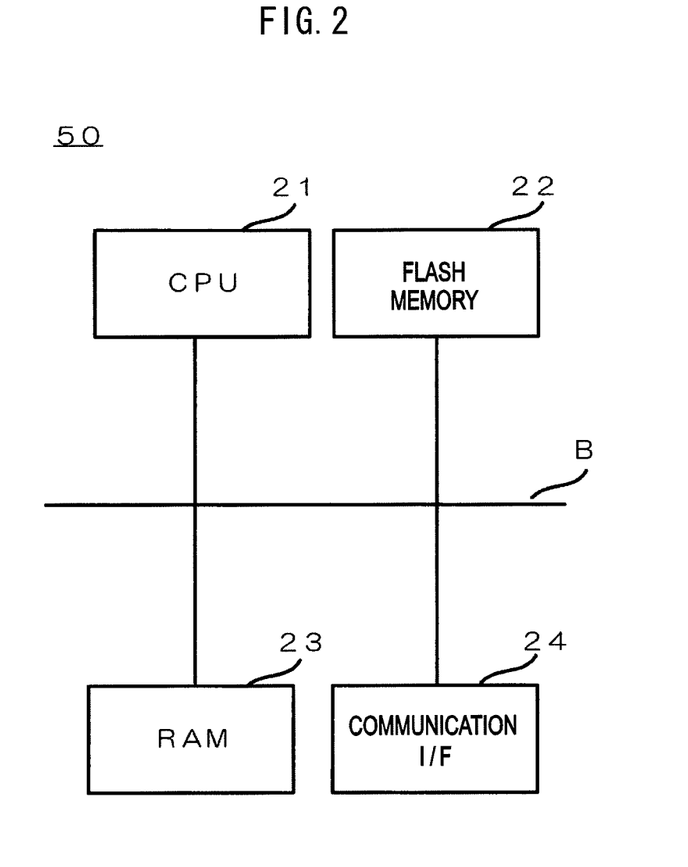
FIG. 2 is a view showing an example of a hardware configuration of a PKI card.

An example of a hardware configuration of a PKI card 50 is shown in FIG. 2. The PKI card 50 is generally configured with one chip. FIG. 2 shows a configuration included in this one chip.

As shown in FIG. 2, the PKI card 50 includes a CPU 21, a flash memory 22, a RAM 23, a communication I/F 24, and the bus B. The CPU 21 is responsible for entire operation of the PKI card 50, and a processing shown in the sequence diagram and a flow chart to be described later is executed by the CPU 21. The flash memory 22 stores information regarding the PKI (such as the private key), a key recording program, the boot program operating when activating and the like. In the RAM 23, the OS is developed and the information obtained by the communication is temporarily developed. The communication I/F 24 is an interface for communicating with the key generating device 30 and for performing communication when signing an electronic signature.

The above-described HDD 15 and flash memory 22 record the key generating program, the key recording program, data used by the program and the like. The programs are not necessarily recorded in the HDD 15 and the flash memory 22. As a storage medium other than the HDD 15, specifically, there is a portable storage medium recording a program. For example, in a case of the key generating program, a reading device for reading the portable storage medium may be provided on the key generating device 30, and the portable storage medium may cause a changing state of energy such as magnetism, light and electricity to the reading device to transmit a descriptive content of the program to the reading device in a format of a signal corresponding to the same.

As the portable storage medium, for example, there are a magnetooptical disk, an optical disk (including a CD and a DVD), a magnetic disk, and a memory (including an IC card and a memory card).

An example of a functional configuration of the key generating device 30 and the PKI card 50 as a key recording system configured with the above-described key generating device 30 and PKI card 50 is described with reference to FIG. 3.

The key generating device 30 is configured with a certificate store 41, a public key certificate generating unit 42, a key pair generating unit 43, and an encoding unit 44.

The key pair generating unit 43 basically generates a public key and a private key corresponding to the public key. Especially, the key pair generating unit 43 in this exemplary embodiment generates a certification public key which is used when recording a signatory private key used in the electronic signature in the PKI card 50 and a certification private key which corresponds to the certification public key, and further generates a signatory public key which is used in the electronic signature and the signatory private key corresponding to the signatory public key.

The public key certificate generating unit 42 generates a certification public key certificate of the certification public key, and further generates a signatory public key certificate of the signatory public key.

The certificate store 41 is provided on the HDD 15 and the certification public key certificate is recorded therein.

The encoding unit 44 generates an encoded signatory key (an encoded signatory public key certificate and an encoded signatory private key) which is obtained by encoding the signatory public key certificate and the signatory private key by the certification public key indicated in the certification public key certificate. Note that the signatory public key certificate is encoded by the certification public key in this exemplary embodiment, however, the signatory public key certificate may not encoded by the certification public key.

Figure 3:
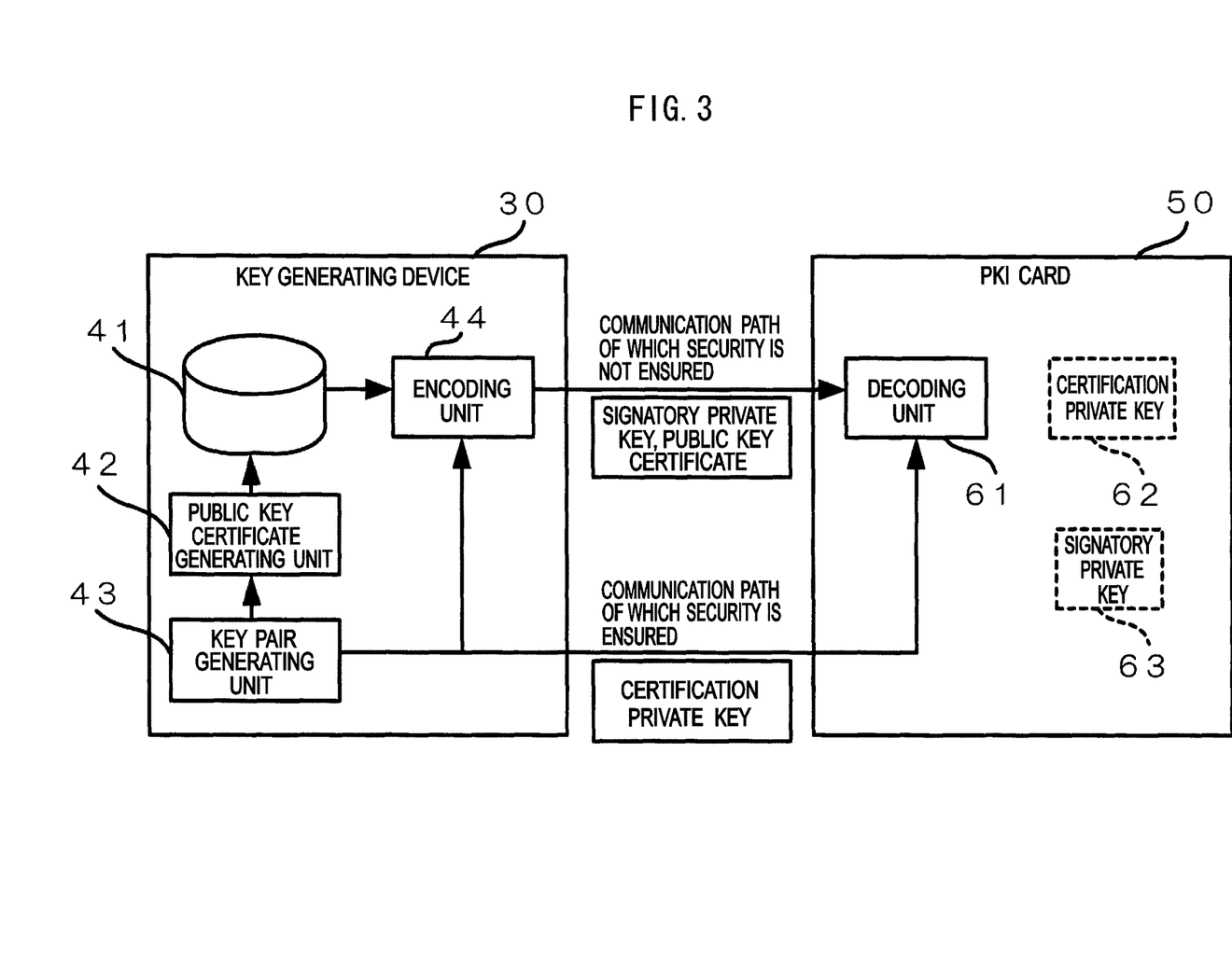
FIG. 3 is a view showing an example of a functional configuration of a key recording system (1)

The certification private key is transmitted to the PKI card 50 through a communication path of which security is ensured, as shown in FIG. 3. The encoded signatory public key certificate and the encoded signatory private key are transmitted to the PKI card 50 through a communication path of which security is not ensured. As a matter of course, they may be transmitted to the PKI card 50 through the communication path of which security is ensured.

The PKI card 50 is configured with a decoding unit 61. A certification private key 62 and a signatory private key 63 are recorded. The decoding unit 61 decodes the encoded signatory key (the encoded signatory public key certificate and the encoded signatory private key) by the certification private key 62.

Figure 4:
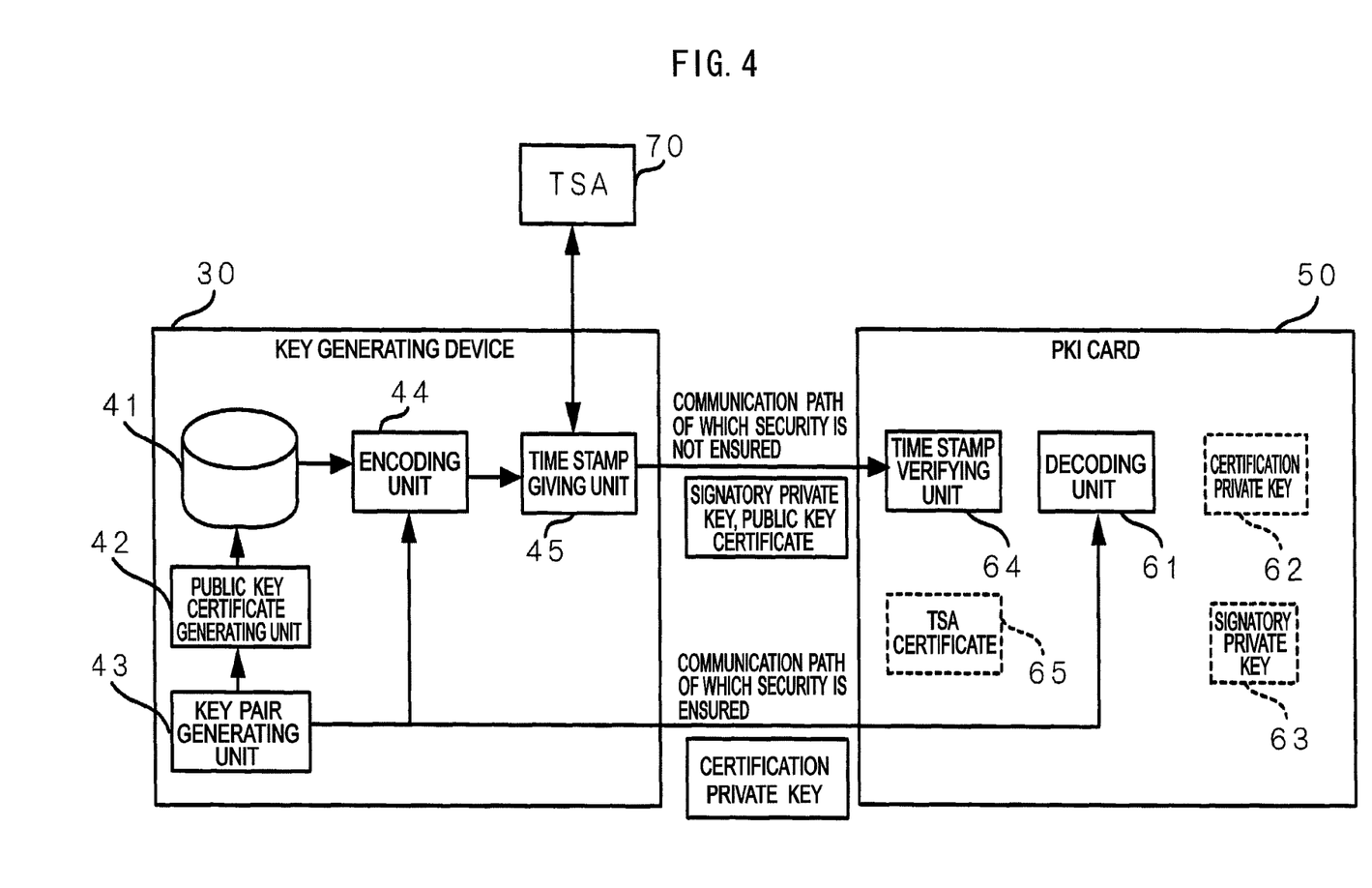
FIG. 4 is a view showing the example of the functional configuration of the key recording system (2)

An example of the functional configuration of the key generating device 30 and the PKI card 50 as the key recording system using a time stamp is described with reference to FIG. 4. In FIG. 4, the description of the configuration described with reference to FIG. 3 is omitted.

In the key generating device 30, a time stamp giving unit 45 is added to the configuration shown in FIG. 3. The time stamp giving unit 45 assigns the time stamp (which is encoded by a TSA private key) obtained by communicating with a time stamp authority (TSA) 70 to the encoded signatory key (the encoded signatory public key certificate and the encoded signatory private key). The key generating device 30 transmits a time stamp authority (TSA) public key certificate indicating the TSA 70 which issues the time stamp.

In the PKI card 50, a time stamp verifying unit 64 is added to the configuration shown in FIG. 3, and the TSA public key certificate is recorded. The time stamp verifying unit 64 verifies whether the time stamp is a time stamp which is issued by the TSA 70 by using the TSA public key certificate, and, when the time stamp is issued by the TSA 70, the time stamp verifying unit 64 verifies whether date and time indicated in the time stamp is within a predetermined time period.

An example of a processing flow of the key generating program and the key recording program performed with the above-described configuration is described with reference to FIG. 5.

Figure 5:
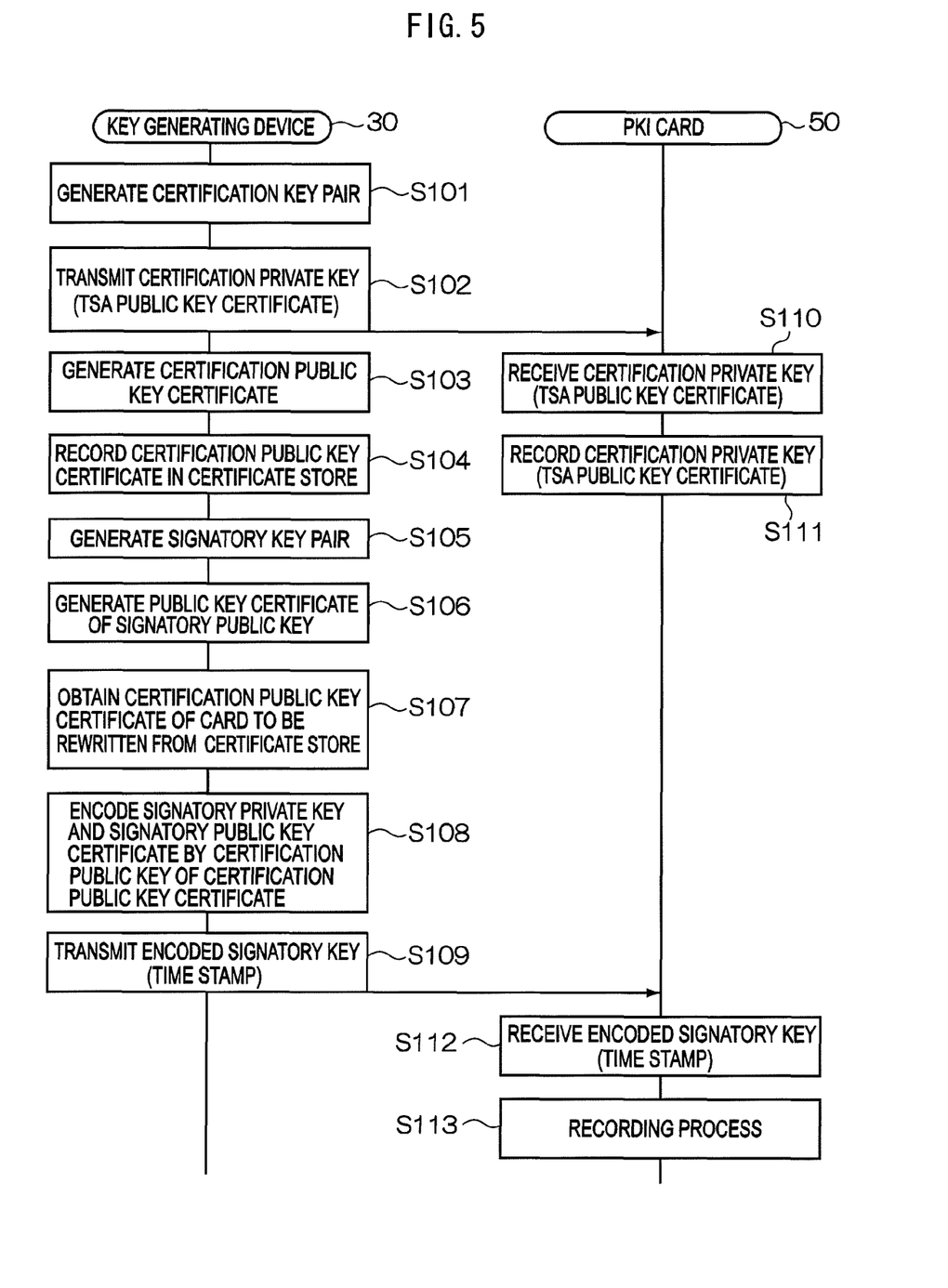
FIG. 5 is a sequence diagram showing an example of a processing flow of a key generating program and a key recording program.

FIG. 5 is the sequence diagram showing a flow of a key generating processing in the key generating device 30 and a key recording processing in the PKI card 50. The key generating processing is performed by the CPU 11 and the key recording processing is performed by the CPU 21.

The key generating device 30 generates a certification key pair at a step 101. Specifically, the key generating device 30 generates the certification public key which is used when recording the signatory private key used in the electronic signature in the PKI card, and the certification private key corresponding to the certification public key.

The key generating device 30 transmits the generated certification private key to the PKI card 50 using the communication path of which security is ensured at a step 102. At that time, when using the time stamp, the TSA public key certificate is further transmitted.

The PKI card 50 receives the certification private key at a step 110. When using the time stamp, the TSA public key certificate is further received.

The certification private key is recorded in the flash memory 22 at a step 111. When using the time stamp, the TSA public key certificate is further recorded in the flash memory 22.

The key generating device 30 generates the certification public key certificate of the certification public key at a step 103, and the key generating device 30 records the certification public key certificate in the certificate store at a step 104.

The key generating device 30 generates a signatory key pair at a step 105. Specifically, the key generating device 30 generates the signatory public key used in the electronic signature and the signatory private key corresponding to the signatory public key.

The key generating device 30 generates the signatory public key certificate of the signatory public key at a step 106. The key generating device 30 acquires the certification public key certificate of the card which is to be rewritten from the certificate store at a step 107, and the key generating device 30 generates the encoded signatory key (the encoded signatory public key certificate and the encoded signatory private key) which is obtained by encoding the signatory private key and the signatory public key certificate by the certification public key of the certification public key certificate at a step 108.

The key generating device 30 transmits the encoded signatory key (the encoded signatory public key certificate and the encoded signatory private key) to the PKI card 50 at a step 109. When using the time stamp, the time stamp is assigned to the encoded signatory key (the encoded signatory public key certificate and the encoded signatory private key) and the encoded signatory key with the time stamp is transmitted.

The PKI card 50 receives the encoded signatory key (the encoded signatory public key certificate and the encoded signatory private key) at a step 112. When using the time stamp, the encoded signatory key (the encoded signatory public key certificate and the encoded signatory private key)

to which the time stamp is assigned is received. The recording processing to record the signatory private key is performed at a step 113.

Figure 6:
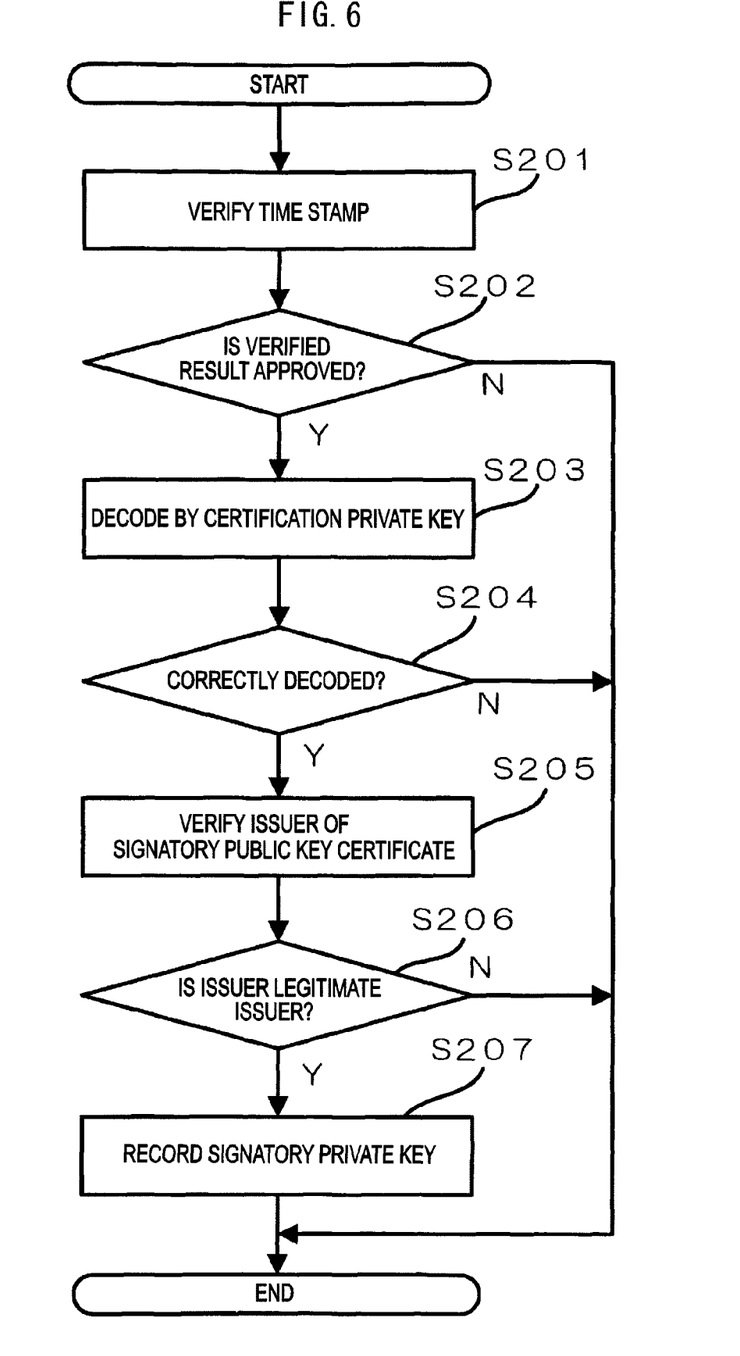
FIG. 6 is a flow chart showing an example of a flow of a recording processing.

An example of the flow of the recording processing is described with reference to a flow chart in FIG. 6.

The PKI card 50 verifies the time stamp at a step 201. It is verified whether the time stamp is issued by a time stamp authority by using a TSA public key certificate. When the time stamp is issued by the time stamp authority, it is verified whether the date and time indicated in the time stamp is within the predetermined time period.

The PKI card 50 judges whether a verified result is approved at a step 202. When it is judged as negative at the step 202, the PKI card 50 directly terminates the processing. When the verified result is approved, that is to say, when the time stamp is issued by the time stamp authority and the date and time indicated in the time stamp is within the predetermined time period, the processing goes to a step 203.

The processing at the steps 201 and 202 are those when using the time stamp, and otherwise, the procedure is started from the step 203.

The PKI card 50 decodes the encoded signatory key (the encoded signatory public key certificate and the encoded signatory private key) by the certification private key at the step 203, and judges whether the encoded signatory key is correctly decoded at a step 204.

When it is judged as negative at the step 204, the PKI card 50 ends the processing. On the other hand, when it is judged as positive at the step 204, the PKI card 50 verifies an issuer of the signatory public key certificate at a step 205.

When it is judged that the issuer is a legitimate issuer as the verified result at a step 206, the PKI card 50 records the signatory private key and the signatory public key certificate which are obtained by decoding the encoded signatory key (the encoded signatory public key certificate and the encoded signatory private key) by the certification private key in the flash memory 22 at a step 207, and ends. On the other hand, when it is judged as negative at the step 206, the PKI card 50 directly terminates the processing.

Figure 7:
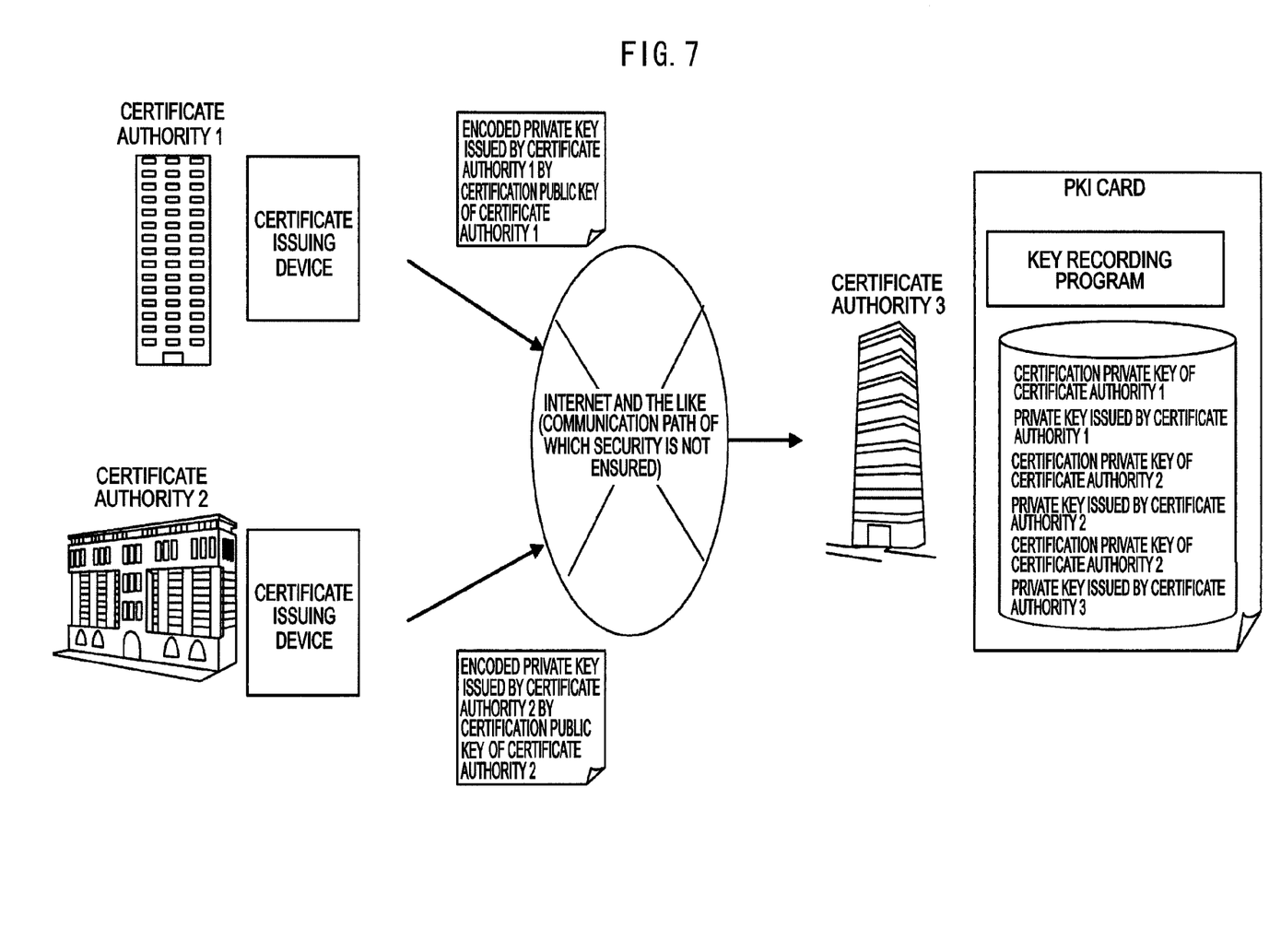
FIG. 7 is a view showing an operation example according to a processing of this exemplary embodiment.

An operation example according to the above-described processing of the exemplary embodiment is shown in FIG. 7. A certificate authority 3 writes the signatory private keys and the signatory public key certificates which are issued by certificate authorities 1 and 2. The certificate authority 3 may not take out the private keys of other certificate authorities recorded in the PKI card and thus the certificate authority 3 may not know the private keys of the certificate authorities 1 and 2. The private keys issued by plural certificate authorities may be recorded in safe in the PKI card.

In the above-described processing, when transmitting the signatory private key which is to be recorded in the PKI card 50, it may be configured to specify a PKI card of a destination. Even when the PKI card may not be specified, the signatory private key, which does not match the PKI card 50, is not recorded, in the above-described processing according to the exemplary embodiment.

As the above-described specifying method, a unique ID may be allocated to the PKI card. In this case, the ID is recorded in the certificate store together with the certification public key certificate. Alternatively, random data may be assigned to the PKI card in advance and the random data may be encoded by the PKI card, then the encoded random data may be obtained and recorded in the certificate store together with the certification public key certificate.

The above-described processing flow in the sequence diagram and the flow chart is no more than one example, and it goes without saying that an processing order may be changed, a new step may be added, and an unnecessary step may be deleted without departing from the spirit of the present invention.

The foregoing description of the embodiments of the present invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to are suited to the particular use contemplated. It is intended that the scope of the invention be defined by the following claims and their equivalents.

What is claimed is:

1. A non-transitory computer readable medium storing a program causing a computer to execute key generating processing, the process comprising:

generating a certification public key which is used when recording a signatory private key used in an electronic signature in a PKI card and a certification private key which corresponds to the certification public key;

transmitting the generated certification private key to the PKI card via a secure communication path;

generating a certification public key certificate for the certification public key;

recording the generated certification public key certificate in a memory;

generating a signatory public key used in the electronic signature and the signatory private key corresponding to the signatory public key;

generating a signatory public key certificate for the signatory public key;

acquiring the certification public key certificate that is recorded in the memory;

generating an encoded signatory key which is obtained by encoding the generated signatory public key certificate and the generated signatory private key using the certification public key indicated in the acquired certification public key certificate;

assigning a time stamp, which is issued by a time stamp authority, to the encoded signatory key;

transmitting the encoded signatory key, to which the time stamp is assigned, to the PKI card via the secure communication path or via a non-secure communication path; and transmitting, to the PKI card, a TSA public key certificate which indicates the time stamp authority which issues the time stamp.

2. The computer readable medium of claim 1, wherein the encoded signatory key is transmitted to the PKI card via the non-secure communication path.

3. A key generating device, comprising:

at least one processor configured to function as:

a first generator that generates a certification public key which is used when recording a signatory private key used in an electronic signature in a PKI card and a certification private key which corresponds to the certification public key;

a first transmitter that transmits the certification private key generated by the first generator to the PKI card via a secure communication path;

a second generator that generates a certification public key certificate for the certification public key;

a recorder that records, in a memory, the certification public key certificate generated by the second generator;

a third generator that generates a signatory public key which is used in the electronic signature and the signatory private key which corresponds to the signatory public key;

a fourth generator that generates a signatory public key certificate for the signatory public key;

an acquirer that acquires the certification public key certificate that is recorded in the memory;

a fifth generator that generates an encoded signatory key which is obtained by encoding the signatory public key certificate generated by the fourth generator and the signatory private key generated by the third generator using the certification public key indicated in the certification public key certificate acquired by the acquisition unit;

a time stamp assigner that assigns a time stamp, which is issued by a time stamp authority, to the encoded signatory key;

a second transmitter that transmits the encoded signatory key, to which the time stamp is assigned, to the PKI card via the secure communication path or via a non-secure communication path; and a third transmitter that transmits, to the PKI card, a TSA public key certificate indicating the time stamp authority.

4. The key generating device of claim 3, wherein:

the recorder further records PKI card data which specifies the PKI card that is the destination of the encoded signatory key; and the second transmitter further transmits the PKI card data.

5. The key generating device of claim 4, wherein the PKI card data is an identifier (ID) of the PKI card.

6. The key generating device of claim 4, wherein the PKI card data is random data encoded by the PKI card.

* * * * *